United States Patent [19]

Hulme

[11] 4,119,655
[45] Oct. 10, 1978

[54] NOVEL GRAPHITE INTERCALATION COMPOUNDS AND METHOD OF MAKING SAME

[75] Inventor: Roger Hulme, Somerville, N.J.

[73] Assignee: Exxon Research & Engineering Co., Linden, N.J.

[21] Appl. No.: 760,157

[22] Filed: Jan. 17, 1977

[51] Int. Cl.$^2$ ............................................. C07F 9/90
[52] U.S. Cl. ................................. 260/440; 252/507; 260/429 R; 260/429.3; 260/429.5; 260/429.7; 260/437 R; 260/446; 260/447; 260/448.2 R; 260/606.5 B; 260/606.5 P
[58] Field of Search ................... 260/606.5 P, 448.2 R, 260/440, 429 R, 429.7, 437 R, 606.5 B, 446, 447, 429.3, 429.5; 252/507

[56] References Cited

U.S. PATENT DOCUMENTS 3,956,194  5/1976  Armand ............................... 252/507
4,035,434  7/1977  Rodewald ............................ 423/448

OTHER PUBLICATIONS

Croft, "Graphite Compounds" Research Science & Its Application in Industry Butterworths Scientific Pub., London pp. 23–28 (1957).
Opalovskii et al, Russ. J. of Inorg. Chem. 19(6) 827–830 (1974).
Opalovskii et al, Russ J. of Inorg. Chem. 17(10), 1366–1368 (1972).
Vogel, Chem. Abst. 84182175a (1976).
Boeck et al., Chem. Abst. 75 125989j (1971).

*Primary Examiner*—Helen M. S. Sneed
*Attorney, Agent, or Firm*—Joseph J. Dvorak

[57] ABSTRACT

Novel intercalates of graphite are prepared by reacting graphite with a Lewis acid fluoride and $ClF_3$ in the presence of HF. These compounds are particularly useful as battery cathodes.

13 Claims, No Drawings

NOVEL GRAPHITE INTERCALATION COMPOUNDS AND METHOD OF MAKING SAME

BACKGROUND OF THE INVENTION

1. Field of the Invention

The present invention relates to the intercalation of graphite with a Lewis acid fluoride in the presence of chlorine trifluoride and hydrogen fluoride thereby producing novel compositions of matter that are useful, for example, as cathode-active materials.

2. Prior Art

Graphite forms intercalation compounds with a wide variety of materials. These inclusion or intercalation compounds have been described as being heteropolar because of their ionic character. See, for example, Angew. Chem. Internat. Edit., Vol. 2 (1963) No. 2. Indeed, graphite has been shown to form salts with sulfates and nitrates, and, in particular, the nitrate salt of graphite [$3HNO_3 \cdot NO_3^-$]$C_{24}^+$ has been shown to have conductivity which approaches that of copper. See *Proc. Roy. Soc. Lond.*, A325, p. 437 (1971).

Graphite has also been reported to form intercalation compounds with hydrogen fluoride; see, for example, *Russian J. of Inorg. Chem.*, 17, p. 632 (1972); and with hydrogen fluoride and chlorine trifluoride. See, for example, *Russian J. of Inorg. Chem.*, 17, p. 1366 (1972).

In U.S. Pat. No. 3,844,837, lamellar graphite compounds, such as the tetrafluoroborate salt of graphite, are described. These compounds were prepared by impressing an electric current between an anode and a graphite cathode immersed in a nonaqueous salt solution such as a nonaqueous solution of lithium tetrafluoroborate.

Mention should also be made of the interaction of graphite with antimony pentafluoride in the presence of chlorine trifluoride to produce a green compound with the proposed formula $C_8^+SbF_6^-\cdot ClF_3$. See *Russian J. of Inorg. Chem.*, 19, p. 827 (1974).

SUMMARY OF THE INVENTION

According to the present invention, novel intercalates of graphite are prepared by reacting a Lewis acid fluoride, notably boron trifluoride, arsenic pentafluoride and phosphorus pentafluoride, with graphite and chloride trifluoride in the presence of hydrogen fluoride.

DESCRIPTION OF THE INVENTION

In the present process, graphite is allowed to react with a Lewis acid, $ClF_3$ and preferably a sufficiently large excess of HF that the HF also serves as a reaction diluent. This reaction can take place at temperatures ranging as low as $-50°$ C and at temperatures ranging as high as $150°$ C. Preferably, the reaction is conducted at temperatures ranging from about $0°$ C to about $100°$ C.

In the practice of the present invention, it is particularly preferred to use the pyrolitic form of graphite although other forms of graphite can be used. For example, exfoliated graphite is also useful in forming intercalated graphite materials. As will be appreciated, the form of graphite used will partly determine the rate at which intercalation takes place and the extent to which the intercalation of graphite takes place.

In any event, the graphite material preferably is suspended in an anhydrous hydrogen fluoride, and indeed preferably excess hydrogen fluoride, and thereafter contacted with $ClF_3$ and a Lewis acid fluoride. Normally, the reaction is most conveniently carried out at atmospheric pressure; however, pressures ranging from 0.1 to 100 atmospheres may be employed.

The Lewis acid fluorides employed in the practice of the present invention are Lewis acid fluorides of the following elements: B, Si, Ge, Sn, Pb, P, As, Sb, Bi, Ti, Zr, Hf, V, Nb and Ta. Typical examples of such Lewis acid fluorides are the following: boron trifluoride, phosphorus pentafluoride, arsenic pentafluoride, antimony pentafluoride, vanadium pentafluoride, tantalum pentafluoride and niobium pentafluoride. The Lewis acid fluorides that are particularly useful as cathode materials, particularly for high energy density battery systems, however, are the Lewis acid fluorides of boron, phosphorus and arsenic. Optionally, the Lewis acid fluoride can be generated in situ by the reaction of $ClF_3$ and one of the foregoing elements or a lower fluoride of such element such as $PF_3$ and $AsF_3$.

The relative molar amounts of Lewis acid fluoride to graphite employed generally is in the range of 1:100 to 10:1 and preferably in the range of 1:20 to 1:1.

The ratio of $ClF_3$ to Lewis acid fluoride employed generally is 1:1 but will be greater if the Lewis acid is to be prepared in situ. Thus, the same relative amounts of $ClF_3$ to graphite are used as Lewis acid fluoride to graphite.

Typically, the ratio of HF to graphite will be greater than 1:1 and indeed it is particularly preferred to use a sufficiently large excess of HF so as to serve as a reaction diluent as well as reactant.

In carrying out the intercalation of graphite, it has been found to be very expedient to first charge an appropriate vessel with the requisite amount of graphite followed by the hydrogen fluoride. Thereafter the $ClF_3$ and Lewis acid fluoride are added. Next the reactants are mixed. Mixing can be accomplished, for example, by means of a polytetrafluoroethylene coated magnetic stirring bar. After mixing for a time sufficient to bring about the intercalation of graphite compound, the intercalated product can be separated from the solution.

Conveniently the $ClF_3$ and optionally the Lewis acid fluoride can be added portionwise with such addition being continued until the vapor over the reaction mixture at room temperature shows no further change in the amount of $ClF_3$ present in the vapor phase. In other words, quantitative addition is continued until the gaseous reactants no longer are absorbed or removed from the vapor phase.

The graphite intercalated materials are royal blue in color and a change in the color of the graphite is a very good indication that the reaction has proceeded smoothly. Consequently, the extent of intercalation can often be detected by visual inspection. Separation of the reaction product can be achieved by filtration, vacuum evaporation, or the like. Typically, the intercalated graphite product contains from about 30 to about 55 weight percent carbon.

The intercalated graphite materials which are prepared in accordance with the present invention have a wide variety of uses. For example, these materials can be used as alkylation catalysts; they can be thermally decomposed to form exfoliated graphite; and they are particularly useful as battery cathodes as described hereinafter.

The following examples are provided to more completely illustrate the invention:

EXAMPLE 1

Four grams of graphite powder were placed in a 45 ml corrosion resistant nickel-alloy reactor; thereafter, 5 grams of arsenic trifluoride were added in a dry nitrogen atmosphere. The vessel was closed, cooled to $-78°$ C and evacuated. Approximately 10 grams of hydrogen fluoride were distilled onto the graphite, followed by several grams of $ClF_3$. The system was allowed to stand at room temperature for 24 hours during which time the pressure rose to about 200 psig. An infrared spectrum of the gas phase showed that only traces of HCl and other IR active species were present. In particular, no $AsF_3$, $ClF_3$ or $AsF_5$ were observed in the gas phase. The vessel was cooled to $-78°$ C and evacuated. Thereafter, more $ClF_3$ was added and the system was again allowed to warm and stand at room temperature. This process was repeated until $ClF_3$ became a permanent component of the gas phase as determined by infrared analysis. Thus, excess $ClF_3$ had been employed. The vessel was then evacuated at room temperature and heated to approximately 100° C while pumping. The solid residue was deep blue in color, weighed 11 grams and was amorphous to powder X-ray diffraction analysis. Elemental analysis showed: 39.9% C; 3.67% Cl; and 0.6% H. Nuclear magnetic resonance spectroscopy on the solid showed a strong absorption due to fluorine.

EXAMPLE 2

2.02 grams of graphite were placed in a chlorotrifluoroethylene plastic vessel which was then evacuated and cooled to $-50°$ C. Approximately 10 ml of anhydrous hydrogen fluoride was distilled in the vessel, followed by $ClF_3$. There appeared to be an immediate blue-green coloration; however, when the system was exposed to $BF_3$ vapor, the green color changed to a royal blue. The volatile materials were removed under vacuum at room temperature and the vessel was pumped to a constant weight. Thereafter excess chlorine trifluoride and boron trifluoride were added in equimolar amounts. After standing 5 minutes, the cell was again evacuated to essentially the same constant weight. The residue, a deep blue material, weighed 3.56 grams, an 84% gain in weight. Elemental analysis revealed the following: C, 40.9%; Cl, 5.5%; B, 1.5%. X-ray diffraction analysis of this material showed maxima corresponding to spacings of 6.86 Å, 6.41 Å and 3.93 Å. The strongest X-ray diffraction peak observed in the pattern of graphite alone is due to planes having a spacing of 3.29 A. This diffraction maximum is not present in the reaction product samples.

EXAMPLE 3

A chlorotrifluoroethylene plastic vessel was charged with 6.29 grams of graphite, evacuated and cooled in liquid nitrogen. About 10 grams of HF were distilled into the vessel on top of the graphite, followed by approximately equimolar amounts of $ClF_3$ and $BF_3$. Thereafter the vessel and its contents were allowed to warm to room temperature. After standing for several days, the volatiles were evacuated from the vessel. Thereafter, additional quantities of $ClF_3$ and $BF_3$ gases were added and the pressure in the vessel gradually dropped. Additions were repeated until no gas take-up was observed. The vessel was then evacuated to give a blue material weighing 12.6 grams. X-ray diffraction analysis of the dark blue material showed peaks corresponding to lattice spacings of 6.20 Å, 3.90 Å and 3.63 Å and weaker lines $13.8 \pm 1$ Å, $11.2 \pm 1$ Å, 2.84 Å. The X-ray analysis is indicative of an opening of the lattice spacings in the graphite.

EXAMPLE 4

Five grams of graphite powder of approximately 10 micron size was placed in a corrosion resistant nickel-alloy reactor which was subsequently evacuated. A trace of $ClF_3$ vapor was then admitted to the vessel to destroy any residual moisture. Thereafter, equimolar amounts of $ClF_3$ and $PF_5$ were added at $-78°$ C and about 20 grams of hydrogen fluoride were also distilled in. When warming to 25° C, the pressure rose to 200 psi. The volatiles were removed and more $ClF_3$ and $PF_5$ in the mole ratio of 1:1 were distilled in. After standing for an hour, the volatiles were again removed by pumping to a constant weight. The final blue residue weighed 9.22 grams and had the following elemental analysis: C, 50.7%; H, 0.4%; P, 4.45%; F, 34.8%; Cl, 4.6%.

EXAMPLE 5

A typical carbon cell is constructed using a glass fiber paper to separate the two compartments. The anode consisted of lithium pressed onto an expanded nickel screen. The cathode in the second compartment consisted of deep blue intercalation compound of graphite formed by mixing excess chlorine trifluoride, phosphorus pentafluoride and anhydrous HF, as in Example 4 above. This compound was mixed with polytetrafluoroethylene and pressed onto an expanded nickel screen. The cell was discharged using 3 molar lithium hexafluorophosphate dissolved in a 50/50 volume % mixture of tetrahydrofuran and dimethoxyethane. The cell has an open cell voltage of 2.6 volts and was discharged at a rate of 5 mA/cm$^2$ to a 104 mA·hr capacity.

What is claimed is:

1. A method of preparing intercalates of graphite comprising contacting graphite with a Lewis acid and $ClF_3$ in the presence of HF at a temperature in the range of from about $-80°$ to $+100°$ C for a time sufficient for intercalation to occur, said Lewis acid being a fluoride of an element selected from B, Si, Ge, Sn, Pb, P, As, Sb, Bi, Ti, Zr, Hf, V, Nb and Ta.

2. The method of claim 1 wherein $ClF_3$, the Lewis acid fluoride and HF are in stoichiometric excess with respect to graphite.

3. The method of claim 2 wherein $ClF_3$ and Lewis acid are in the mole ratio of 1:1.

4. The method of claim 3 wherein HF is in such sufficiently large excess as to serve as a reaction diluent.

5. The method of claim 3 wherein the Lewis acid is $BF_3$.

6. The method of claim 3 wherein the Lewis acid is $PF_5$.

7. The method of claim 1 wherein the Lewis acid is $AsF_5$.

8. The method of claim 1 wherein the Lewis acid fluoride is a pentafluoride generated in situ by the reaction of $ClF_3$ with a trifluoride of said element.

9. The method of claim 1 wherein the Lewis acid fluoride is generated in situ by the reaction of $ClF_3$ and an element selected from B, Si, Ge, Sn, Pb, P, As, Sb, Bi, Ti, Zr, Hf, V, Nb and Ta.

10. A blue compound of graphite consisting essentially of graphite, $ClF_3$, HF and a Lewis acid fluoride of an element selected from B, Si, Ge, Sn, Pb, P, As, Sb, Bi, Ti, Zr, Hf, V, Nb and Ta, said graphite being present in an amount ranging from about 30 to about 55 weight %.

11. The compound of claim 10 wherein the Lewis acid fluoride is $BF_3$.

12. The compound of claim 10 wherein the Lewis acid fluoride is $AsF_5$.

13. The compound of claim 10 wherein the Lewis acid fluoride is $PF_5$.

* * * * *